United States Patent
Kubota et al.

(10) Patent No.: US 9,727,931 B2
(45) Date of Patent: Aug. 8, 2017

(54) ELECTRICITY DEMAND PREDICTION SYSTEM

(75) Inventors: Kei Kubota, Tokyo (JP); Hiroyuki Imanari, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 469 days.

(21) Appl. No.: 14/374,986

(22) PCT Filed: Feb. 14, 2012

(86) PCT No.: PCT/JP2012/053328
§ 371 (c)(1),
(2), (4) Date: Jul. 28, 2014

(87) PCT Pub. No.: WO2013/121515
PCT Pub. Date: Aug. 22, 2013

(65) Prior Publication Data
US 2014/0371934 A1    Dec. 18, 2014

(51) Int. Cl.
*G06Q 50/06* (2012.01)
*G05B 13/04* (2006.01)
(Continued)

(52) U.S. Cl.
CPC ............ *G06Q 50/06* (2013.01); *G05B 13/04* (2013.01); *H02J 3/00* (2013.01); *H02J 2003/003* (2013.01); *Y02P 80/14* (2015.11)

(58) Field of Classification Search
None
See application file for complete search history.

(56) References Cited

U.S. PATENT DOCUMENTS

2012/0010757 A1 *    1/2012    Francino ............... G05B 15/02
                                                  700/291

FOREIGN PATENT DOCUMENTS

JP    6 284572    10/1994
JP    8 308108    11/1996
(Continued)

OTHER PUBLICATIONS

International Preliminary Report on Patentability and Written Opinion issued Aug. 28, 2014, in International Application No. PCT/JP2012/053328.
(Continued)

*Primary Examiner* — Eric C Wai
(74) *Attorney, Agent, or Firm* — Oblon, McClelland, Maier & Neustadt, L.L.P.

(57) ABSTRACT

An electricity demand prediction system includes electricity usage data collection means, production schedule storage means, model creation means, and short-term electricity demand prediction means. The electricity usage data collection means collects electricity usage data of each device and causes electricity usage data storage means to store the collected electricity usage data. The model creation means creates an electricity amount calculation model of each prescribed product type for each device on the basis of the electricity usage data stored in the electricity usage data storage means and a past production schedule stored in the production schedule storage means. The short-term electricity demand prediction means computes future electricity demand for each device on the basis of the electricity amount calculation model created by the model creation means and a future production schedule stored in the production schedule storage means.

6 Claims, 5 Drawing Sheets

(51) Int. Cl.
*H02J 3/00* (2006.01)
*G05D 3/12* (2006.01)
*G05D 5/00* (2006.01)
*G05D 9/00* (2006.01)
*G05D 11/00* (2006.01)
*G05D 17/00* (2006.01)

(56) References Cited

FOREIGN PATENT DOCUMENTS

| JP | 2002 165362 | 6/2002 |
| JP | 2004 112869 | 4/2004 |
| JP | 2004-129322 A | 4/2004 |
| JP | 2004 183007 | 7/2004 |
| JP | 2005-92827 A | 4/2005 |
| JP | 2011 239528 | 11/2011 |

OTHER PUBLICATIONS

International Search Report Issued Nov. 6, 2012 in PCT/JP12/053328 Filed Feb. 14, 2012.
Combined Office Action and Search Report issued Jan. 15, 2016 in Chinese Patent Application No. 201280069695.8 (with Partial English translation and English translation of Categories of Cited Documents).
Office Action issued Feb. 11, 2016 in Korean Patent Application No. 10-2014-7022089 (with Partial English translation).

* cited by examiner

FIG. 1

No. 4 : NON-UTILITY GENERATION EQUIPMENT
No. 5 : ELECTRIC COMPANY

ELECTRICITY DEMAND PREDICTION SYSTEM

TECHNICAL FIELD

The present invention relates to an electricity demand prediction system applied to an industrial plant which includes a plurality of devices.

BACKGROUND ART

In an industrial plant provided with non-utility generation equipment, the whole electricity used in the plant is covered by both electricity by non-utility generation and electricity purchased from an electric company (contract electricity demand). In such an industrial plant, electricity which becomes necessary in the future (electricity demand) is predicted and the amount of electricity generated by non-utility generation (the amount of electricity by non-utility generation) is adjusted on the basis of the predicted value. That is, the total amount (i.e., a total value of the amount of electricity by non-utility generation and the amount of contract electricity demand) is set so that the amount of electricity supplied to the plant does not become lower than the above-described predicted value.

Patent Literature 1 below describes a system for predicting electricity demand. In the system described in Patent Literature 1, electricity demand is predicted on the basis of the amount of electricity used in a whole plant (an actual value).

CITATION LIST

Patent Literature

Patent Literature 1: Japanese Patent Laid-Open No. 8-308108

SUMMARY OF INVENTION

Technical Problem

If the accuracy of a prediction of electricity demand is low in an industrial plant, an amount of electricity by non-utility generation and an amount of contract electricity demand must be determined in consideration of errors in a predicted value. That is, if the accuracy of a prediction of electricity demand is low, an amount of electricity by non-utility generation and an amount of contract electricity demand must be increased in consideration of errors in a predicted value.

In conventional systems, a prediction of electricity demand has been performed on the basis of the amount of electricity used by a whole plant and, therefore, in the case where a change occurs in a production schedule and in the case where an unexpected change occurs in the action of a device, it has been impossible to adapt a predicted value to such phenomena. That is, in conventional systems, differences between predicted values and actual values have been great and it has been impossible to effectively reduce the amount of electricity by non-utility generation and the amount of contract electricity demand on the basis of the predicted values.

The present invention was made in order to solve the above-described problem and an object of the present invention is to provide an electricity demand prediction system which increases the prediction accuracy of electricity demand in an industrial plant and can appropriately reduce the amount of electricity by non-utility generation and the amount of contract electricity demand.

Solution to Problem

An electricity demand prediction system of the present invention is a system which is applied to an industrial plant including a plurality of devices. The system comprises first collection means for collecting electricity usage data of each of the devices and causing first storage means to store the collected electricity usage data, second storage means in which a production schedule in the industrial plant is stored, model creation means for creating an electricity amount calculation model of each prescribed product type for each of the devices on the basis of the electricity usage data stored in the first storage means and a past production schedule stored in the second storage means, and first prediction means for computing future electricity demand for each of the devices on the basis of the electricity amount calculation model created by the model creation means and a future production schedule stored in the second storage means.

Advantageous Effect of Invention

With the electricity demand prediction system of the present invention, it is possible to increase the prediction accuracy of electricity demand in an industrial plant and it is possible to appropriately reduce the amount of electricity by non-utility generation and the amount of contract electricity demand.

DESCRIPTION OF EMBODIMENT

The present invention will be described in detail with reference to the accompanying drawings. In each of the drawings, identical numerals refer to identical or corresponding parts. Redundant descriptions are appropriately simplified or omitted.

First Embodiment

Figure 1:
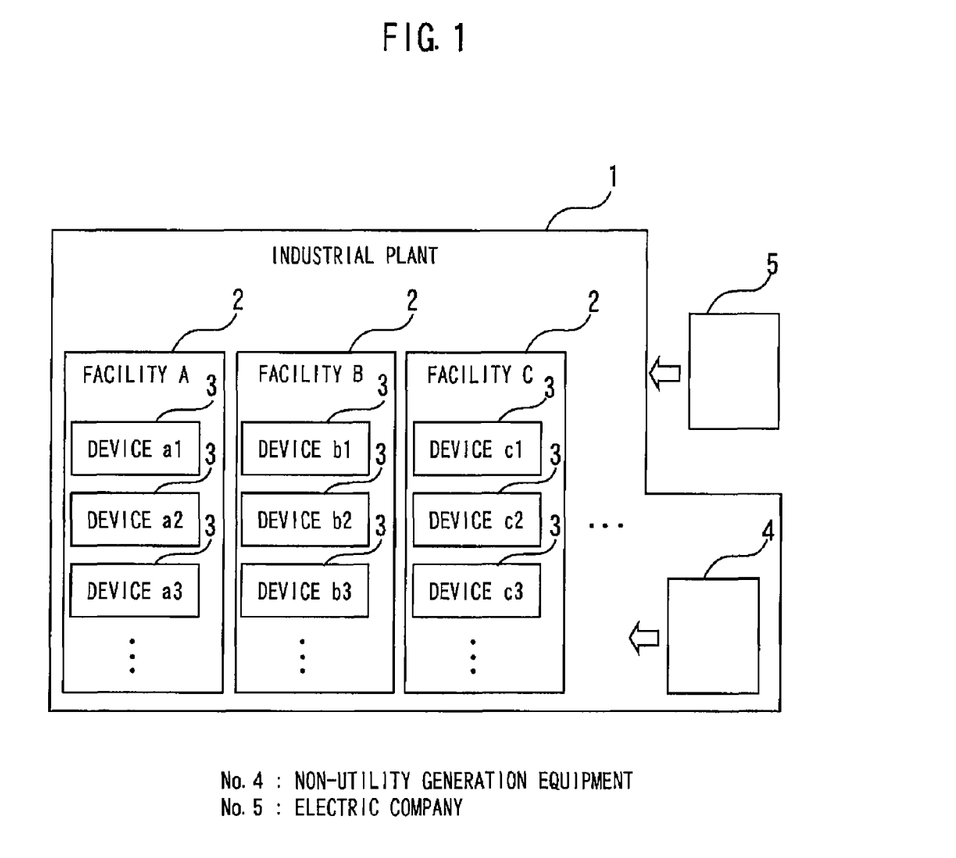
FIG. 1 is a diagram showing an example of configuration of an industrial plant.

FIG. 1 is a diagram showing an example of configuration of an industrial plant. FIG. 1 shows an example of an industrial plant to which this electricity demand prediction system is applied.

In FIG. 1, reference numeral 1 denotes an industrial plant for producing prescribed products. Products produced by the industrial plant 1 include things such as semi-finished products. The industrial plant 1 includes a plurality of facilities 2. Each of the facilities 2 includes a plurality of devices 3.

The industrial plant 1 includes non-utility generation equipment 4. In the industrial plant 1, the whole electricity used in the plant is covered by electricity supplied from the non-utility generation equipment 4 and electricity purchased from an external electric company 5.

Figure 2:
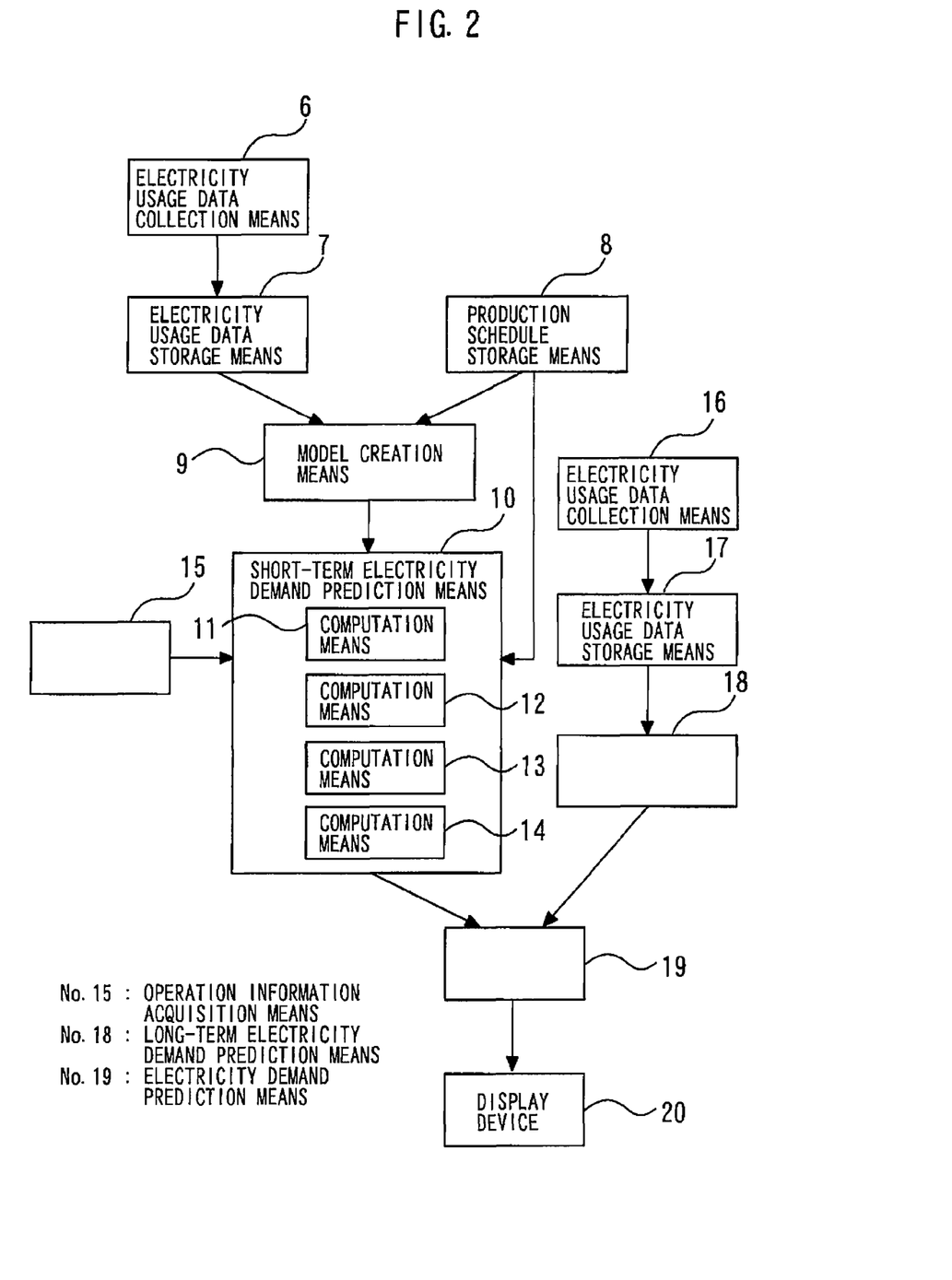
FIG. 2 is a block diagram showing an electricity demand prediction system in a first embodiment of the present invention.

FIG. 2 is a block diagram showing an electricity demand prediction system in a first embodiment of the present invention.

The electricity demand prediction system predicts electricity which becomes necessary (electricity demand) in the future in the industrial plant 1. The electricity demand prediction system includes electricity usage data collection means 6 and 16, electricity usage data storage means 7 and 17, production schedule storage means 8, model creation means 9, short-term electricity demand prediction means 10, operation information acquisition means 15, long-term electricity demand prediction means 18, electricity demand prediction means 19, and a display device 20.

The electricity usage data collection means 6 collects data on the electricity used by the devices 3 (electricity usage data: actual values) for each of the devices 3. It is preferred that the electricity usage data collection means 6 collect electricity usage data from all of the devices 3 provided in the industrial plant 1. However, the industrial plant 1 includes a large number of devices 3. For this reason, it is not always necessary that for devices 3 whose power consumption is exceedingly small, small devices 3 and the like, collection of electricity usage data be performed. The electricity usage data collection means 6 need not collect electricity usage data from all devices 3 that consume electricity.

Electricity usage data for each device 3 is stored in the electricity usage data storage means 7. Upon acquisition of electricity usage data of the devices 3, the electricity usage data collection means 6 causes the electricity usage data storage means 7 to store the acquired data. The amount of electricity used by each device 3 is stored in the electricity usage data storage means 7 by being correlated to time information.

A production schedule in the industrial plant 1 is stored in the production schedule storage means 8. A production schedule refers to a schedule for producing products using each facility 2 (each device 3). Prescribed data by type regarding products is included in a production schedule in a time series manner.

The model creation means 9 has a function of creating a model (electricity amount calculation model) for calculating the amount of electricity used by the devices 3. The model creation means 9 creates the above-described electricity amount calculation model for each of the devices 3 and for each prescribed product type. The model creation means 9 performs the creation of an electricity amount calculation model on the basis of the electricity usage data stored in the electricity usage data storage means 7 and a past production schedule stored in the production schedule storage means 8.

Figure 3:
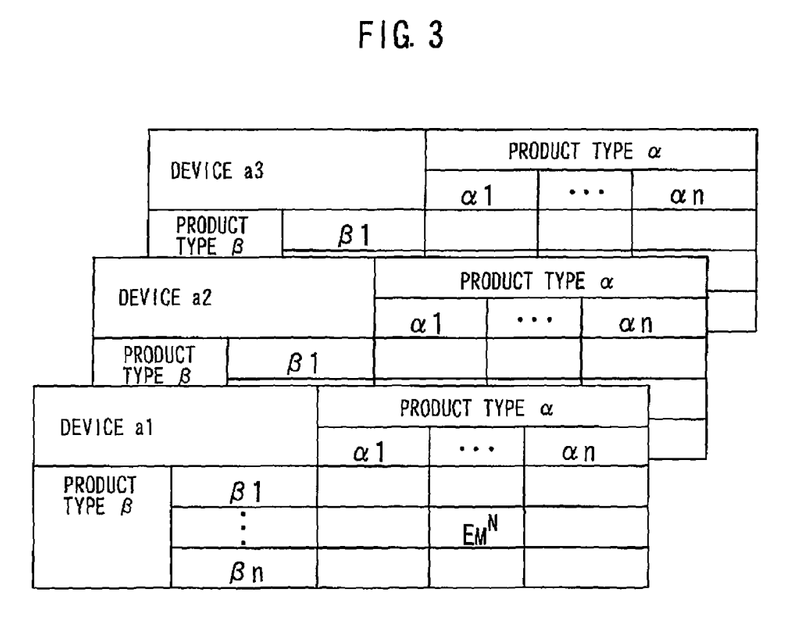
FIG. 3 is a diagram to explain a function of model creation means.

FIG. 3 is a diagram to explain the function of the model creation means.

The model creation means 9 creates an "electricity unit consumption by product type" management table as shown in FIG. 3, for example, as an electricity amount calculation model, for each product type 3.

For example, the amount of electricity used by device a1 (an actual value) is stored in the electricity usage data storage means 7 by being correlated to time information. Data on a schedule actually carried out in device a1 (past data) is stored in the production schedule storage means 8. This past data includes, for example, data by product types α and β in a time series manner.

The model creation means 9 tallies up and models the amount of electricity used by device a1 for each product type on the basis of each of the storage contents of the electricity usage data storage means 7 and the production schedule storage means 8. That is, the model creation means 9 creates a model capable of deriving the electricity unit consumption $E_M^N$ of device a1 by identifying each data by product types α (α1 to αn) and β (β1 to βn).

Also for devices a2, a3 . . . , devices b1, b2, b3 . . . , devices c1, c2, c3 . . . , the model creation means 9 creates similar models.

The short-term electricity demand prediction means 10 has a function of computing electricity which becomes necessary in the short-term future (short-term electricity demand) in the industrial plant 1. In order to realize this function, the short-term electricity demand prediction means 10 includes computation means 11 to 14.

The computation means 11 computes the electricity which becomes necessary in the future (short-term electricity demand) in the devices 3. The computation means 11 computes future electricity demand for each of the devices 3. The computation means 11 performs the computation of short-term electricity demand on the basis of the electricity amount calculation model created by the model creation means 9 and a future production schedule stored in the production schedule storage means 8.

The computation means 12 computes the electricity which becomes necessary in the future (short-term electricity demand) in the facilities 2. The computation means 12 computes future electricity demand for each of the facilities 2.

Devices 3 belonging to a prescribed facility 2 are determined beforehand. For example, facility A includes device a1, device a2, device a3 . . . . Similarly, facility B includes device b1, device b2, device b3 . . . . The computation means 12 adds up the electricity demand computed by the computation means 11 for the devices 3 provided in the facilities 2, thereby computing the electricity demand of the facilities 2. For example, the computation means 12 derives the electricity demand of facility A by adding up all of the electricity demand of device a1, electricity demand of device a2, electricity demand of device a3 . . . , which are computed by the computation means 11.

The computation means 13 computes the electricity which becomes necessary in the future (short-term electricity demand) in the industrial plant 1. The computation means 13 adds up the electricity demand of each of the facilities 2 computed by the computation means 12, thereby computing the future electricity demand of the whole plant.

In this manner, the short-term electricity demand prediction means 10 computes the electricity demand of each of the devices 3 and thereafter adds the electricity values of single devices in a bottom-up manner, thereby deriving the short-term electricity demand of the whole plant.

The computation means 14 computes the electricity presently used (electricity usage) in the devices 3. The computation means 14 computes present electricity usage for each of the devices 3.

The operation information acquisition means 15 has a function of acquiring present operation information in the industrial plant 1. The computation means 14 performs the computation of the above-described electricity usage on the basis of the present operation information acquired by the operation information acquisition means 15 and the electricity amount calculation model created by the model creation means 9.

The short-term electricity demand prediction means 10 (the computation means 11) may compute electricity demand for each of the devices 3 also in consideration of the present electricity usage computed by the computation means 14. With this configuration, it is possible to reflect the present state of the plant in the derived electricity demand of the whole plant.

The electricity usage data collection means 16 collects data on the electricity used by the industrial plant 1 (electricity usage data: actual values), i.e., the electricity usage data of the whole plant. For example, the electricity usage data collection means 16 acquires electricity values in receiving points of a factory as the electricity usage data.

Electricity usage data of the industrial plant 1 is stored in the electricity usage data storage means 17. Upon acquisition of the electricity usage data of the whole plant, the electricity usage data collection means 16 causes the electricity usage data storage means 17 to store the acquired data. The amount of electricity used by the whole plant is stored in the electricity usage data storage means 17 by being correlated to time information.

The long-term electricity demand prediction means 18 has a function of computing electricity which becomes necessary in the long-term future (long-term electricity demand) in the industrial plant 1. The long-term electricity demand prediction means 18 computes future electricity demand of the industrial plant 1 by using, for example, a data mining technique on the basis of the electricity usage data stored in the electricity usage data storage means 17.

The electricity demand prediction means 19 computes the electricity which becomes necessary in the future (electricity demand) in the industrial plant 1. Computation results of the electricity demand prediction means 19 become outputs (predicted values) of this system. The electricity demand prediction means 19 performs the computation of the above-described electricity demand on the basis of the electricity demand of the whole plant computed by the short-term electricity demand prediction means 10 (short-term prediction) and the electricity demand of the whole plant computed by the long-term electricity demand prediction means 18 (long-term prediction).

For example, the electricity demand prediction means 19 finds a predicted value (G3) by lapping the short-term prediction over the long-term prediction. Formula 1 below shows an example of a model used in the above-described lapping.

$$G3 = \gamma 1 * G1 + \gamma 2 * G2 \quad (1)$$

In Formula 1 above, G1 is a long-term predicted value of electricity demand (computation result of the long-term electricity demand prediction means 18) and G2 is a short-term predicted value of electricity demand (computation result of the short-term electricity demand prediction means 10). $\gamma 1$ and $\gamma 2$ are correction terms.

Figure 4:
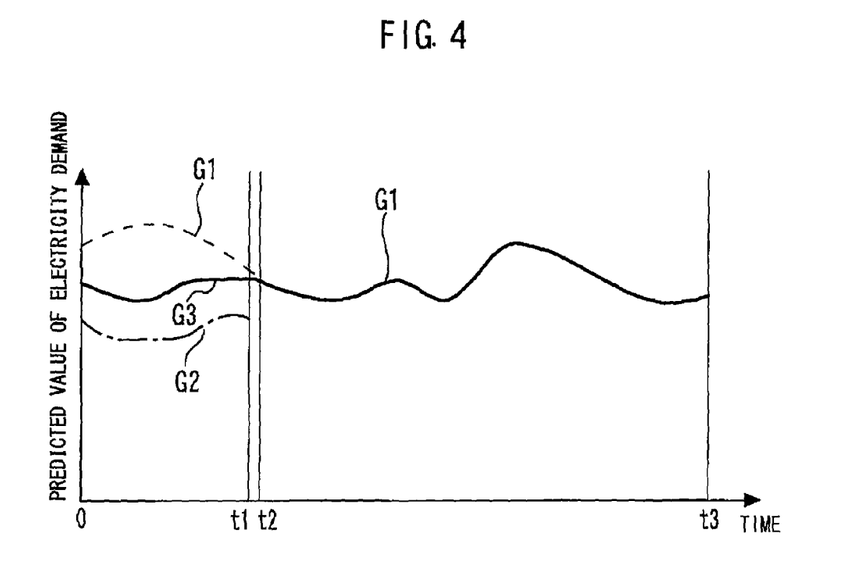
FIG. 4 is a diagram to explain a function of electricity demand prediction means.

FIG. 4 is a diagram to explain the function of the electricity demand prediction means. FIG. 4 shows computation results of the electricity demand prediction means 19 obtained when Formula 1 above is used. In FIG. 4, G1 is indicated by a broken line, G2 is indicated by an alternate long and short line, and G3 is indicated by a solid line.

The short-term predicted value of electricity demand G2 can be obtained only for a prescribed period from present (time t=0) to time t1. For this reason, regarding the period until time t2 (for example, t2>t1), for example, the electricity demand prediction means 19 computes the predicted value G3 using both the long-term predicted value of electricity demand G1 and the short-term predicted value of electricity demand G2 ($\gamma 1 \approx 0$, $\gamma 2 \approx 0$). Also, regarding a prescribed period later than time t2 (the period from time t2 to t3), the electricity demand prediction means 19 computes the predicted value G3 on the basis of the long-term predicted value of electricity demand G1 without using the short-term predicted value of electricity demand G2 ($\gamma 1 \approx 0$, $\gamma 2 = 0$):

The period from time t1 to t2 is a transition period for preventing abrupt variations in the predicted value G3. The above-described transition period may be included in the period until time t1 by setting time t2 so that the relationship t1>t2 is held.

For the period from time t2 to t3, if $\gamma 1 = 1$, then it is possible to output the long-term predicted value G1 as the predicted value G3 just as it is. For the period from time t2 to t3, a value which is a little larger than 1 or the like may be adopted as $\gamma 1$.

Future electricity demand (predicted values) of the industrial plant 1 computed by the electricity demand prediction means 19 is displayed on the display device 20.

Each of the means shown in FIG. 1 may be configured by any device (including those by hardware, those by software, and those by both).

With an electricity demand prediction system having the above-described configuration, it is possible to substantially increase the prediction accuracy of electricity demand. That is, in this electricity demand prediction system, the short-term prediction of electricity demand is performed by the addition of the electricity values of single devices in a bottom-up manner. Then, the electricity demand of the whole plant is computed also in consideration of the obtained short-term prediction. For this reason, with this electricity demand prediction system, in the case where a change occurs in a production schedule, and also in the case where an unexpected change occurs in the facilities 2 (the devices 3), it is possible to easily adapt predicted values to these phenomena. With this electricity demand prediction system, it is possible to reduce differences in predicted values and actual values and it is possible to substantially reduce the amount of electricity by non-utility generation and the amount of contract electricity demand.

Next, a description will be given of a specific example of an application of the above-described electricity demand prediction system.

Figure 5:
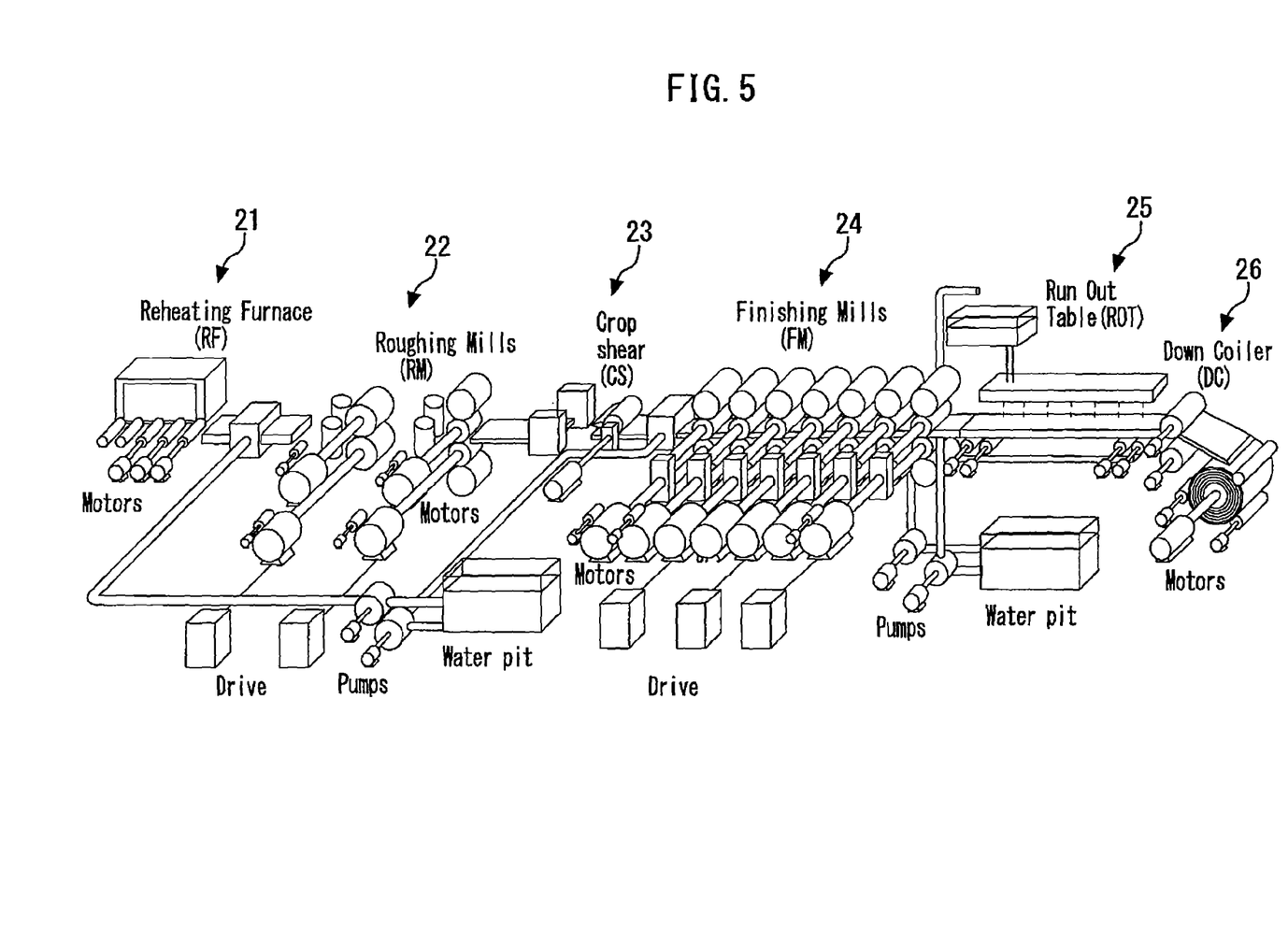
FIG. 5 is a diagram showing an outline of a hot rolling plant of ironworks.
Figure 6:
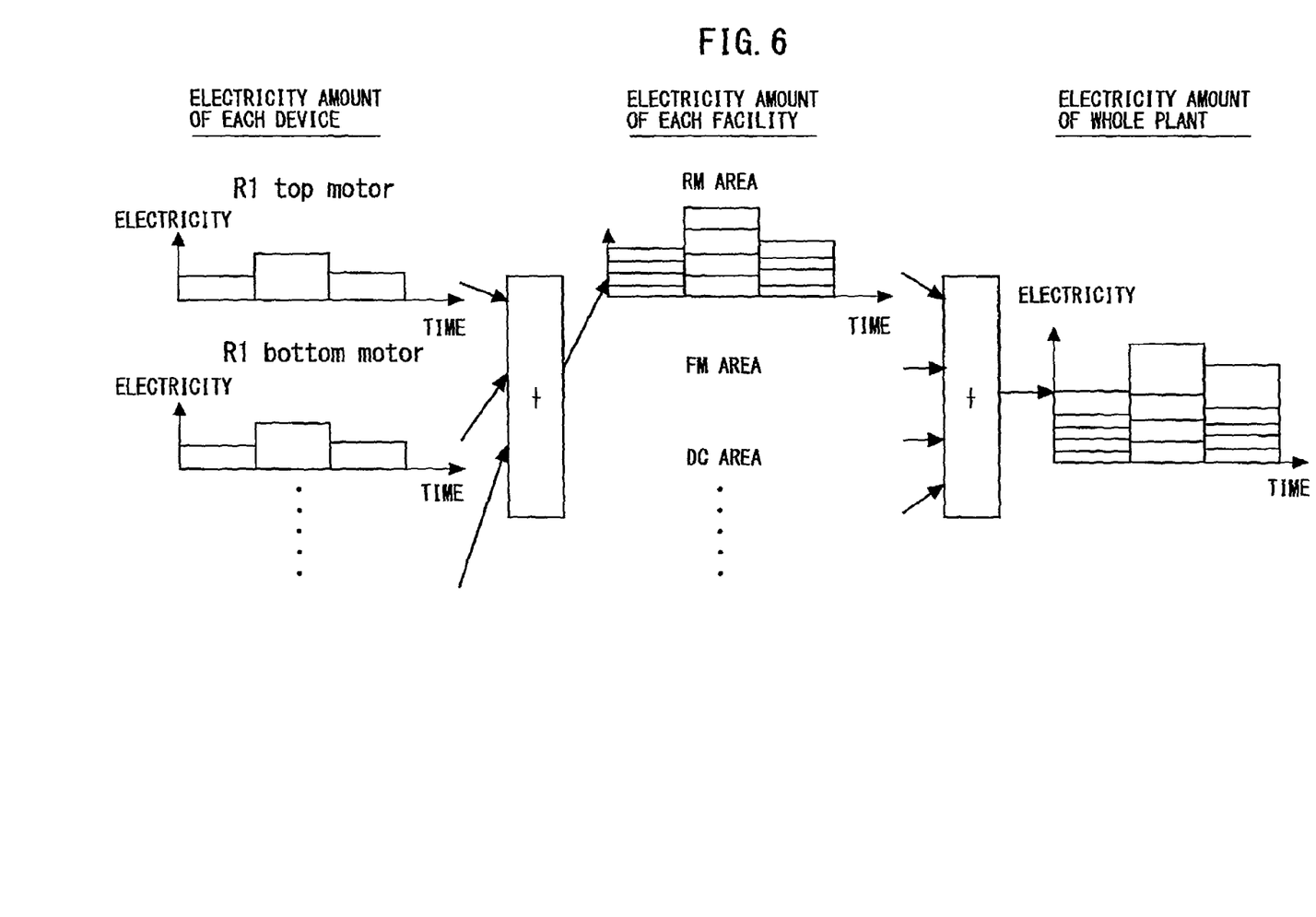
FIG. 6 is a diagram to explain actions of the electricity demand prediction system in the first embodiment of the present invention.

FIG. 5 is a diagram showing an outline of a hot rolling plant of ironworks. FIG. 6 is a diagram to explain actions of the electricity demand prediction system in the first embodiment of the present invention. FIG. 6 shows actions which occur when this electricity demand prediction system is applied to the hot rolling plant shown in FIG. 5.

As shown in FIG. 5, the hot rolling plant includes a plurality of facilities 2, such as a reheating furnace (RF) 21, roughing mills (RMs) 22, a crop shear (CS) 23, finishing mills (FMs) 24, a run-out table (ROT) 25, and a down coiler (DC) 26. Each of the facilities 2 includes a plurality of devices 3, such as motors, pumps, and drives.

The electricity usage data collection means 6 collects electricity usage data from each of the motors, pumps and drives provided in the hot rolling plant, and causes the electricity usage data storage means 7 to store the collected electricity usage data. Past production schedules carried out in the hot rolling plant and future production schedules to be carried out in this hot rolling plant are stored in the production schedule storage means 8. Each data on material length, material width, material thickness, and steel grade is included in a production schedule in a time series manner, for example, as types of rolled materials (products).

The model creation means 9 creates an electricity amount calculation model for each device 3 and each product type from electricity usage data (actual values) of each device 3 and past production schedules. For example, in performing the modeling, the model creation means 9 classifies the electricity amount data, with product types as material length, material width, material thickness, and steel grade.

The short-term electricity demand prediction means 10 performs a short-term prediction of electricity demand (calculation of future data on electricity amount) from electricity amount calculation models, future production schedules, and operation information. The operation information acquisition means 15 acquires, for example, position information of rolled materials in a line, motor speed information, and motor torque information as operation information.

In the short-term electricity demand prediction means 10, first, present data on electricity amount (electricity usage) of each device 3 is computed by the computation means 14. As shown in FIG. 6, the computation means 11 computes future data on the electricity amount of each device 3. The computation means 12 computes future data on electricity amount of each facility 2 (of each area in the example shown in FIGS. 5 and 6) on the basis of calculation results of the computation means 11. The computation means 13 calculates future data on the electricity amount of the whole plant by adding all future data calculated by the computation means 12.

The electricity usage data collection means 16 acquires electricity values in receiving points of the hot rolling plant as electricity usage data of the whole hot rolling plant. The electricity usage data collection means 16 causes the electricity usage data storage means 17 to store the acquired electricity values by being correlated to time information. The long-term electricity demand prediction means 18 performs a long-term prediction of electricity demand (calculation of future data on electricity amount) on the basis of the electricity usage data stored in the electricity usage data storage means 17. Then, the electricity demand prediction means 19 calculates output values of the system from the obtained short-term prediction and long-term prediction of electricity demand.

In a hot rolling plant of ironworks, the electricity usage of the whole plant varies greatly when production schedules are changed and when manual operations by operators are performed. For this reason, in conventional prediction methods, predicted values sometimes deviate from actual values. With this electricity demand prediction system, it is possible to perform an electricity prediction by adapting to the operation condition of a production process which changes from second to second. For this reason, it becomes possible to substantially improve the accuracy of electricity prediction also in a hot rolling plant by adopting this electricity demand prediction system.

INDUSTRIAL APPLICABILITY

This electricity demand prediction system can be applied to, for example, a cold rolling plant of ironworks in addition to a hot rolling plant of ironworks. Also, this electricity demand prediction system can be applied to various kinds of industrial plants, for example, a paper mill, a beverage plant, and a food factory in addition to ironworks.

REFERENCE SIGNS LIST 1 industrial plant
2 facility
3 device
4 non-utility generation equipment
5 electric company
6, 16 electricity usage data collection means
7, 17 electricity usage data storage means
8 production schedule storage means
9 model creation means
10 short-term electricity demand prediction means
11, 12, 13, 14 computation means
15 operation information acquisition means
18 long-term electricity demand prediction means
19 electricity demand prediction means
20 display device
21 reheating furnace
22 roughing mill
23 crop shear
24 finishing mill
25 run-out table
26 down coiler

The invention claimed is:

1. An electricity demand prediction system which is applied to an industrial plant including a plurality of devices, comprising:
a first collection device for collecting electricity usage data of each of the devices and causing first storage device to store the collected electricity usage data;
a second storage device in which a production schedule in the industrial plant is stored;
a model creation device for creating an electricity amount calculation model of each prescribed product type for each of the devices based on the electricity usage data stored in the first storage device and a past production schedule stored in the second storage device;
a first prediction device for computing future electricity demand for each of the devices based on the electricity amount calculation model created by the model creation device and a future production schedule stored in the second storage device and for adding up the computed future electricity demand of each of the devices to compute future electricity demand of the industrial plant;
a second collection device for collecting electricity usage data of the industrial plant and causing third storage device to store the collected electricity usage data;
a second prediction device for computing future electricity demand of the industrial plant based on the electricity usage data stored in the third storage device; and
a third prediction device for computing future electricity demand of the industrial plant for a prescribed first period based on the electricity demand of the industrial plant computed by the first prediction device and the electricity demand of the industrial plant computed by the second prediction device and for computing future electricity demand of the industrial plant for a prescribed second period later than the prescribed first period based on the electricity demand of the industrial plant computed by the second prediction device without using the electricity demand of the industrial plant computed by the first prediction device, wherein the electricity demand prediction system reduces an amount of electricity by applying the future electricity demand computed for the prescribed first and second periods.

2. The electricity demand prediction system according to claim 1, wherein
the industrial plant comprises a plurality of facilities,
each of the facilities comprises a plurality of the devices, and the first prediction device comprises:
first computation device for computing future electricity demand for each of the devices based on the electricity amount calculation model created by the model creation device and the future production schedule stored in the second storage device;
second computation device for computing future electricity demand for each of the facilities by adding up the electricity demand computed by the first computation device for the devices provided in the facilities; and
third computation device for computing future electricity demand of the industrial plant by adding up the electricity demand for each of the facilities computed by the second computation device.

3. The electricity demand prediction system according to claim 2, further comprising:
a display device for displaying the electricity demand of the industrial plant computed by the third prediction device.

4. The electricity demand prediction system according to claim 1, further comprising:
a display device for displaying the electricity demand of the industrial plant computed by the third prediction device.

5. The electricity demand prediction system according to claim 1, further comprising:
an operation information acquisition device for acquiring present operation information in the industrial plant,
wherein the first prediction device computes present electricity usage for each of the devices based on the operation information acquired by the operation information acquisition device and the electricity amount calculation model created by the model creation device, and computes electricity demand for each of the devices also in consideration of the computed present electricity usage.

6. An electricity demand prediction system which is applied to an industrial plant including a plurality of facilities, each of the facilities including a plurality of devices, comprising:
a first collection device for collecting electricity usage data of each of the devices and causing first storage device to store the collected electricity usage data;
a second storage device in which a production schedule in the industrial plant is stored;
a model creation device for creating an electricity amount calculation model of each prescribed product type for each of the devices based on the electricity usage data stored in the first storage device and a past production schedule stored in the second storage device;
a first prediction device for computing future electricity demand for each of the devices based on the electricity amount calculation model created by the model creation device and a future production schedule stored in the second storage device, the first prediction device comprising:
first computation device for computing future electricity demand for each of the devices based on the electricity amount calculation model created by the model creation device and the future production schedule stored in the second storage device;
second computation device for computing future electricity demand for each of the facilities by adding up the electricity demand computed by the first computation device for the devices provided in the facilities; and
third computation device for computing future electricity demand of the industrial plant by adding up the electricity demand for each of the facilities computed by the second computation device;
a second collection device for collecting electricity usage data of the industrial plant and causing a third storage device to store the collected electricity usage data;
a second prediction device for computing future electricity demand of the industrial plant based on the electricity usage data stored in the third storage device; and
a third prediction device for computing future electricity demand of the industrial plant for a prescribed first period based on the electricity' demand of the industrial plant computed by the first prediction device and the electricity demand of the industrial plant computed by the second prediction device and for computing future electricity demand of the industrial plant for a prescribed second period later than the prescribed first period based on the electricity demand of the industrial plant computed by the second prediction device without using the electricity demand of the industrial plant computed by the first prediction device, wherein the electricity demand prediction system reduces an amount of electricity by applying the future electricity demand computed for the prescribed first and second periods.

* * * * *